March 12, 1946.    J. F. RILEY    2,396,474
DESICCATOR UNIT
Filed March 6, 1944

INVENTOR
JOSEPH F. RILEY
BY
ATTORNEY

Patented Mar. 12, 1946

2,396,474

UNITED STATES PATENT OFFICE 2,396,474

DESICCATOR UNIT

Joseph F. Riley, Chicago, Ill., assignor, by mesne assignments, to the Government of the United States of America, as represented by the Secretary of the Navy Application March 6, 1944, Serial No. 525,327

1 Claim. (Cl. 219—19)

This invention relates to dehumidifier or desiccator units of the type which are placed in an enclosure to control the humidity by absorbing moisture from the air within the enclosure.

Devices for this general purpose have taken various forms, many of which have been very useful in accomplishing the purpose for which they have been designed. These devices may be divided into two general types. The first type uses a nonregenerable desiccant such as calcium chloride, which is replaced when expended. An example of this type is shown in the patent to G. E. Poggel, No. 1,920,914, issued August 1, 1933. The second type uses a regenerable desiccant such as silica gel, Activated Alumina, or "Drierite" which is an anhydrous form of calcium sulfate. Examples of this type, using regenerable desiccants are shown in Patents 2,067,920 and 2,190,168 to Heuser and Armistead respectively.

This invention relates to devices of the second type, using a desiccant which is regenerated by the application of heat to the desiccating material, to drive out the moisture whereupon the desiccant is again ready for use.

It is the primary object of this invention to provide an improved desiccating unit of the type using a desiccator which is regenerable by heat.

It is another object of this invention to provide a regenerable desiccating unit of simple construction which may be easily removed from the chamber or cabinet wherein it is used for the purpose of regenerating the desiccant.

Another object of this invention is the provision of an improved regenerable desiccating unit of the type having a built-in heating unit for regenerating the desiccant wherein the heater is effective for the length of the unit, and is protected from the effects of the moisture in the desiccant.

Other objects will become apparent as the description proceeds in connection with the appended claim and the annexed drawing, in which:

Figure 2:
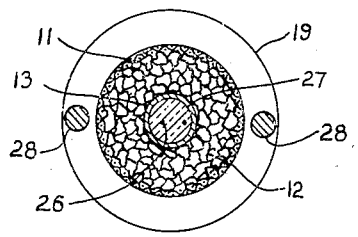
Fig. 2 is a sectional view of the device at the line 2—2 of Fig. 1, looking in the direction of the arrows.
Figure 1:
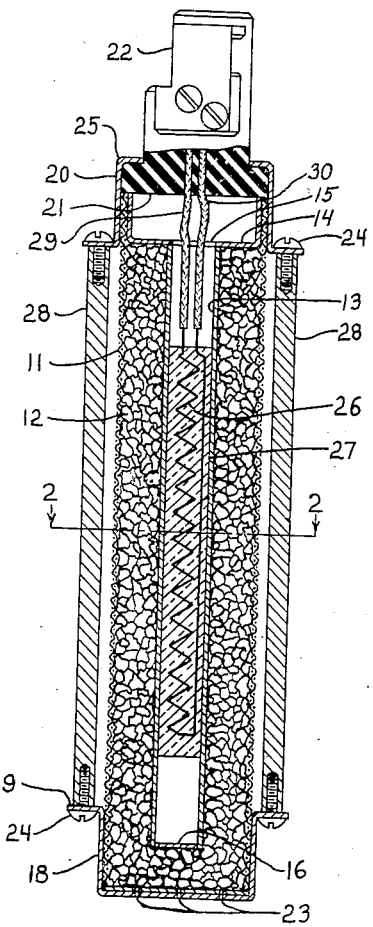
Fig. 1 is a view showing the device in elevation, most of it in section through its center.

As shown in Fig. 1 a cylindrical foraminous container 11 of wire screen contains the regenerable desiccating material 12. This desiccating material may be silica gel, Activated Alumina, "Drierite," or any other regenerable desiccant. The screen 11 is of fairly large mesh, so as to allow air to pass freely therethrough but not so large as to allow the particles of desiccant to fall out.

Centrally disposed within the screen 11 is a metal tube 13 which extends substantially the length of the screen. At its upper end the tube 13 is fastened, as by soldering, to a cup shaped closure 14 which fits snugly within, and closes the upper end of the screen container 11. The closure 14 is provided with a central hole 15 which is no smaller than the inside diameter of tube 13. At its lower end, tube 13 may be closed by a disc 16, soldered in place.

At its lower end, screen 11 is closed by a disc 17 and a cup shaped member 18 having an annular flange 19. Aligned perforations 23 in 17 and 18 permit the passage of air to the desiccant in the lower part of the device. The upper end of screen 11 is further closed, and held in assembled relationship with the closure 14 by means of a cup shaped member 20 which is identical with the member 18 except that it has a central opening for the passage of an insulating body 21 which forms part of an electrical connector having a metal contact 22.

Extending between the flanges 19 of the cup shaped members 18 and 20 are a pair of rods 28 which are fastened to the flanges by screws 24, to hold the entire unit in assembled relationship. As shown in Fig. 1 the insulating body 21 has a flange 25 which is clamped between closure 14 and member 20.

An electrical heating element comprising a resistance wire 26 molded in a porcelain rod 27 is located within the metal tube 13 approximately at its mid-length. The resistance wire is connected to the metal contacts 22 by a pair of leads 29 and 30. The size and heating capacity of the heating element will depend upon the size of the desiccating unit, and should be of sufficient capacity to dry and regenerate the desiccant in from 10 to 15 minutes.

In order to dissipate the heat from the heating unit evenly throughout the mass of desiccant, and in order to prevent the destructive action of air and moisture on the heating element, it is enclosed in the metallic tube 13. This tube is preferably of copper, in order to transmit the heat quickly to its end portions, but any other metal having a lower coefficient of conductivity is suitable. It should therefore be understood that the length of the porcelain rod 27 and the resistance wire 26 imbedded therein need not be proportionately as large as shown in the drawing, since it is the length of the metal tube 13 that is important. As shown in the drawing, the tube 13 should extend substantially from end to end of the column of desiccating material 12. The wire molded in the porcelain is shown only as an example of one form of heating unit. Other suitable types may be used.

In use, the desiccating unit is suspended in the chamber or cabinet in which it is used. The method of support therein forms no part of this invention and no method of support is shown, but in practice it is mounted for quick detachment by means such as a pair of spring clips, so that it can easily be removed from the cabinet in order to regenerate it.

In a similar manner, the electrical connector means 22 form no part of the invention, since any desirable connecting means may be attached to the insulating body 21. The connector 22 shown in Fig. 1 is a bayonet type found suitable in a particular installation.

When the desiccant 12 has become spent, in that it holds so much moisture that its efficiency is lowered below a reasonable point, the entire unit is removed from the cabinet and connector 22 are plugged into a source of electricity. When the desiccant has been regenerated, the device is disconnected from the electricity and replaced in the cabinet.

Since the device is designed to be regenerated in a certain length of time on a specified applied voltage, instructions as to the voltage and time of application can be attached, as by printing, etc. to part of the device, such as one of the cup shaped members 18 or 20.

I claim:

A dehumidifier unit comprising an elongated foraminous container; a metallic tube disposed centrally of and extending substantially the full length of said container; regenerable desiccating material between said container and tube; and an electric heating unit disposed within said tube, closure means secured at one end of said tube and closing one end of said container, cup-shaped end members disposed one at each end of said container, electrical connection means disposed between said closure means and one of said end members, and means drawing said end members toward each other thus serving to hold the unit together.

JOSEPH F. RILEY.